United States Patent
Grimsley (10) Patent No.: US 10,429,267 B2
(45) Date of Patent: Oct. 1, 2019

(54) PIPE ASSEMBLY

(71) Applicant: DURA-LINE CORPORATION, Knoxville, TN (US)

(72) Inventor: Timothy A Grimsley, Knoxville, TN (US)

(73) Assignee: DURA-LINE CORPORATION, Knoxville, TN (US)

( * ) Notice: Subject to any disclaimer, the term of this patent is extended or adjusted under 35 U.S.C. 154(b) by 522 days.

(21) Appl. No.: 15/189,989

(22) Filed: Jun. 22, 2016

(65) Prior Publication Data

US 2016/0377503 A1 Dec. 29, 2016

Related U.S. Application Data (60) Provisional application No. 62/183,474, filed on Jun. 23, 2015.

(51) Int. Cl.
| | |
|---|---|
| *F16L 1/11* | (2006.01) |
| *G01M 3/40* | (2006.01) |
| *G01V 3/02* | (2006.01) |
| *F16L 9/12* | (2006.01) |

(52) U.S. Cl.
CPC .............. *G01M 3/40* (2013.01); *F16L 1/11* (2013.01); *G01V 3/02* (2013.01); *F16L 9/125* (2013.01); *F16L 2201/30* (2013.01)

(58) Field of Classification Search
CPC .................................................. F16L 2201/30
See application file for complete search history.

(56) References Cited

U.S. PATENT DOCUMENTS

| | | | |
|---|---|---|---|
| 4,289,553 | A | 9/1981 | Nolf |
| 7,093,858 | B1 | 8/2006 | Russel |
| 2003/0231020 | A1 | 12/2003 | Yonezawa et al. |
| 2004/0098212 | A1 | 5/2004 | Hong et al. |
| 2004/0211272 | A1 | 10/2004 | Aronstam et al. |
| 2008/0254664 | A1 | 10/2008 | Hiner et al. |
| 2011/0030875 | A1 | 2/2011 | Conte et al. |
| 2013/0263958 | A1 | 10/2013 | Vinoy |
| 2014/0037383 | A1 | 2/2014 | Giraldi |

FOREIGN PATENT DOCUMENTS

| | | |
|---|---|---|
| CA | 2817162 | 5/2013 |
| DE | 102006036720 | 2/2008 |

(Continued)

OTHER PUBLICATIONS

3M: "Polyethylene Tape 483 Technical Data", Apr. 30, 2011, XP055290340, URL:http://multimedia.3m.com/mws/media/92452O/polyethylene-tape-483.pdf&fn=70070950210.pdf (retrieved on Jul. 21, 2016) (2 pages).

(Continued)

*Primary Examiner* — Lisa M Caputo
*Assistant Examiner* — Alex T Devito
(74) *Attorney, Agent, or Firm* — Dentons US LLP (57) ABSTRACT

Disclosed herein is a pipe assembly containing a pipe, an insulating jacket coupled to the pipe via an attachment base; and a tracer wire within the insulating jacket. The width of the attachment base is greater than width of the insulating jacket. Also disclosed herein are methods of locating a pipe concealed below a ground surface, and detecting the presence and the position of a leak in a pipe concealed below a ground surface.

18 Claims, 6 Drawing Sheets

(56) References Cited

FOREIGN PATENT DOCUMENTS

EP   0408320    5/1994
JP   H05106766  4/1993

OTHER PUBLICATIONS

Canadian Office Action dated Mar. 10, 2015 in related Application No. 2838628 filed Jan. 7, 2014 (3 pages).
Canadian Office Action dated Jul. 14, 2015 in related Application No. 2838628 filed Jan. 7, 2014 (4 pages).
Canadian Office Action dated Dec. 21, 2016 in related Application No. 2838628 filed Jan. 7, 2014 (4 pages).
Canadian Office Action dated Oct. 12, 2017 in related Application No. 2977693 filed Jan. 7, 2014 (4 pages).
Canadian Office Action dated May 30, 2018 in related Application No. 2977693 filed Jan. 7, 2014 (4 pages).
European Search Report dated Apr. 15, 2014 in related Application No. 14150233.6 filed Jan. 6, 2014 (6 pages).
European Search Report dated Aug. 11, 2014 in related Application No. 14150233.6 filed Jan. 6, 2014 (8 pages).
European Search Report dated Jul. 28, 2016 in related Application No. 14150233.6 filed Jan. 6, 2014 (6 pages).
International Search Report and Written Opinion dated Sep. 26, 2016 in related Application No. PCT/US16/38821 filed Jun. 22, 2016 (13 pages).
Canada Office Action dated Oct. 25, 2018, issued in connection with related Canadian Patent Application No. 2987127, filed Jun. 22, 2016 (4 pages).

FIG. 1

(PRIOR ART)

PIPE ASSEMBLY

RELATED APPLICATIONS

This application claims the benefit of U.S. Provisional Application No. 62/183474 filed on Jun. 23, 2015.

TECHNICAL FIELD

The present disclosure relates to a pipe assembly having traceability and leakage detection features and pipes incorporating the same.

BACKGROUND

Various utilities such as Water supply and Sewerage Board, Gas Utilities, Municipal Authorities etc. bury pipe to connect with mains below the surface of the earth. Depending on the type of the utility, the installation and location of the pipes can vary. For example, in the case of water supply utilities, pipes are installed from source to storage to water treatment plant to main reservoir, to houses and communities being serviced. In the case of gas utilities, pipes carry gas from a production facility to a processing facility to gate stations to homes and businesses. The materials used in making pipes for a utility can vary based on functional specifications and includes, among others well known to persons of ordinary skill in the art, fiberglass piping, plastic piping, metal piping or concrete piping.

Different detection and location methods exist to locate the pipes that are underground. For example, the location of a metal pipe is easily determined by means of magnetometer devices or by applying RF signals to the pipe and picking up the radiation from the pipe with a sensing device. For pipes that avoid detection by magnetometer or RF signal such as plastic pipes, there is no suitable conventional location technique. For example, it is common practice to provide markings on curbings and to use 'as-built' drawings for reference to locate underground pipes. However, experience shows that these markings and drawings are not always accurate and often many holes must be dug in an attempt to locate the pipe. With the large number of plastic pipes installations, the randomness of the dig and locate method is impractical.

Sometimes locating wires are laid alongside, spiraled around, or taped to the plastic pipes. U.S. Pat. Nos. 4,573, 829, 6,286,542, and 5,044,824 describe methods and means to insert a conducting wire into an existing pipeline so as to detect the location of pipe. However, while these locating wires are more accurate than the dig and locate method, they also pose problems as they can easily be dislodged or knocked off from the pipe during transit from the manufacturing point or during installation of the pipe, and no longer follow the path of the plastic pipes. As such known methods of using locating wires do not present a sustainable and effective solution for traceability.

Additionally, not only is it important to be able to determine the exact location of pipes, it also important to be able to determine if a pipe is damaged or if there is a leak in a pipeline. Various known methods are available for the detection of leaks in pipes. In one such system, an electric pulse is sent down a transmission line placed in proximity to a pipe being monitored. Reflections of the pulses are monitored and threshold values are established above and below the reflected waveforms. Upon the occurrence of a leak or break in the pipe or a break in the cable, the characteristic impedance of the line changes thus resulting in a change in the waveform of the reflection. If the change in impedance is sufficient to cause the waveform to cross either the upper or lower threshold, a leak or break is indicated. By noting the position of the change in shape of the waveforms, the location and other characteristics of the leak may be determined. However, this method requires the use of transmission line, which may cause an irregularity in impedance when the transmission wire becomes dislodged or damaged from the pipe even though the pipe is not itself damaged. When only the transmission line is damaged (but not the pipe) unnecessary time, materials and expenses are spent to repair or fix a duct body with no actual damage. The result is that the transmission wire becomes an ineffective tool for determining if an actual repair is needed because it is not certain if the irregularity in impedance is caused by the damaged duct body or a damaged transmission wire.

Thus, to overcome the aforementioned drawbacks, there exists a need for a simple, economical and practical system that can locate the pipe, detect leakage, or both in a non-metallic pipe using a tracer wire that is not easily dislodged or broken when coupled to a duct body.

SUMMARY

In order to overcome the above limitations, embodiments of the invention provides for an attachment system to be used with a tracer wire for traceability and leakage detection purposes. An embodiment includes an attachment base to securely couple a tracer wire to a pipe allowing for more reliable damage detection feature, a leakage detection system, or a combination of any of the foregoing. Other embodiments include a pipe assembly including a pipe, an insulating jacket coupled to the pipe via an attachment base; and a tracer wire within the insulating jacket. The pipe assembly can further include a means for generating and applying electrical pulses to the tracer wire. The pipe assembly can further include a pulse generator as means for generating and applying pulses. The pipe assembly can further include a means for receiving reflections of the electrical pulses from the tracer wire. The pipe assembly can include an oscilloscope. In certain embodiments, a plurality of pipe assemblies are butt welded together to form a continuous pipeline. The pipe assembly can further include a pipe made of non-metallic material. The pipe assembly can further include a means for storing the reflections to provide a stored representation of the reflections. The pipe assembly can further include means for joining the two tracer wires of adjacent pipes, such as a flexible multistrand cable. The flexible multistrand cable can have tubular metal lugs at its ends for crimping and to insulate the ends of the tracer cable. The pipe assembly can further include the attachment base with a width greater than a width of the insulating jacket. The attachment base can have a width within the range of about 5 mm to 8 mm, both inclusive.

Certain embodiments include a method of locating a pipe below a ground surface. The method includes the steps of providing a pipe assembly containing a pipe, an insulating jacket coupled to the pipe via an attachment base, and a tracer wire within the insulating jacket; connecting the tracer wire on the pipe to a signal generator; passing a signal through the tracer wire by the signal generator; and sensing the signal on the surface by means of any known sensing device. The pipe assembly further includes the attachment base with a width greater than a width of the insulating jacket.

Certain embodiments include a method of detecting a leak in a pipe concealed below a ground surface. The method includes the steps of connecting a pulse generator to a pipe assembly comprising a pipe, an insulating jacket coupled to the pipe via an attachment base, and a tracer wire within the insulating jacket, wherein width of the attachment base is greater than width of the insulating jacket. Then, the method also includes passing pulses through the tracer wire by the pulse generator; receiving reflections of the pulses from the tracer wire; and analyzing the reflections to determine presence of a leak. In certain embodiments, the method includes analyzing the reflections to determine position of the leak.

Certain embodiments include a method of joining tracer cables associated with two non-metallic pipes. The method includes the steps of separating a first tracer cable from a first insulation jacket to expose a first end, wherein the first insulation jacket is coupled to a first pipe via a first attachment base, and width of the first attachment base is greater than width of the first insulating jacket. The method also includes separating a second tracer cable from a second insulation jacket to expose a second end, wherein the second insulation jacket is coupled to a second pipe via a second attachment base, and width of the second attachment base is greater than width of the second insulating jacket. Then, the method also includes joining the first end of the first tracer cable to a first lug and joining the second end of the second tracer cable to a second lug, wherein the first and second lugs are attached to two ends of a multistrand insulated cable. The method can also include applying a heat shrinkage sleeve to encompass the first and second lugs and the multistrand insulated cable; and heating the heat shrinkage sleeve to create a joint of the first tracer cable and the second tracer cable.

The above summary is not intended to describe each embodiment or every implementation of the present invention. Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION

In the following description of the illustrated embodiments, references are made to the accompanying drawings which form a part hereof, and in which is shown by way of illustration, various embodiments in which the invention may be practiced. It is to be understood that other embodiments may be utilized and structural and functional changes may be made without departing from the scope of the inventions disclosed herein.

Figure 1:
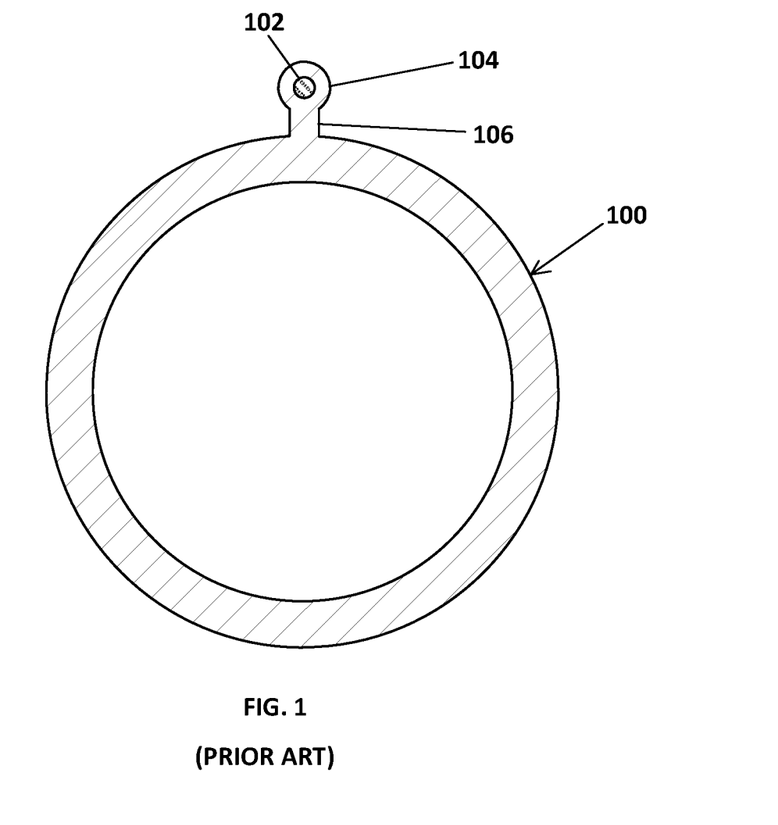
FIG. 1 depicts a cross sectional view of a pipe known in the art.

Referring to the accompanying drawings, FIG. 1 shows a cross sectional view of a pipe 100 with a pinpoint wire 102 encased in a protective insulation 104. The pinpoint wire 102 or its protective insulation 104 is coupled to the pipe 100 via a narrow base 106.

Figure 2:
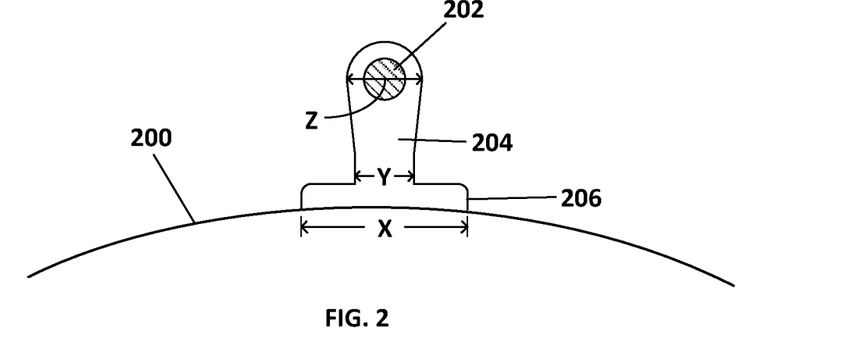
FIG. 2 depicts a sectional view of a duct body having a single tracer wire, according to an exemplary embodiment.

FIG. 2 shows a sectional view of a duct body 200 with a tracer wire 202 within an insulating jacket 204 and an attachment base 206. The duct body 200 is made of suitable polymer material such as polybutylene, unplasticised polyvinylchloride, polyethylene (PE or HDPE), polypropylene, cross-linked polyethylene, other plastics, or other pipe materials known in the art. The duct body has a tracer cable 202 along a portion of its length or its entire length encased in suitable polymer material that forms an insulating jacket 204. The insulating jacket is coupled to the duct body via an attachment base 206. The attachment base 206 has a shape that has a width x, which is greater than the width y of the insulating jacket, the width z of the insulating jacket and the tracer wire, or both. In an example, the shape of the attachment base 206 is rectangular or square. In an example, the width of the base x is in the range from and including 5 mm to 8 mm, both inclusive. In an embodiment the width of the base x is about 5 mm, about 6 mm, about 7 mm or about 8 mm.

In an example the attachment base 206 is secured to the duct body using any adhesive known to persons of ordinary skill in the art. The insulating jacket and the attachment base are made of materials suitable for the expected temperatures and pressures with no or minimal vulnerability to electrolytic corrosion. As the attachment base 206 has a width greater than at least the width of the insulating jacket 204, the insulating jacket is coupled to the duct body on a greater surface area of the duct body than the conventional art, thereby attaching the tracing wire more securely to the duct body. In certain embodiments, the attachment base and the insulating wire can be parts of a single unit. In certain embodiments, the attachment base and the insulating wire can be two separate units securely coupled to each other, through physical means or chemical adhesion means or combinations thereof. As a result, the tracing wire is coupled more securely to the duct body and less likely to be damaged or removed during transit or when the pipe is laid underground, thereby reducing the occurrences of an impedance irregularity caused by damaged tracing wires and the amount of false positives for pipe location and or damage detection. The attachment base can be part of the duct body, or can be securely coupled to the duct body, through physical means or chemical means or combinations thereof. Physical means include any means by which the attachment base can be securely coupled to the pipe or the duct, such as a slot/insert, protrusion/groove, nails, screws, or other mechanical fasteners, or where heat or pressure is applied to couple the attachment base to the pipe or the duct such as crimping, welding, soldering, brazing, or others known in the art. Chemical means include gluing, cementing, or the use of other adhesives.

Figure 3:
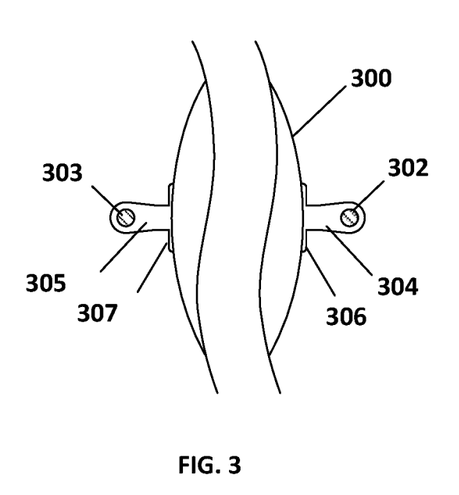
FIG. 3 depicts a sectional view of a duct body having a double tracer wire, according to an exemplary embodiment.

FIG. 3 depicts a duct body 300 with two tracing wires 302 and 303 each of which are encased within insulating jackets 304 and 305, and coupled to the duct body 300 via attachment bases 306 and 307 respectively. In this example, the attachment bases 306 and 307 have widths greater than the widths of the insulating jackets 304 and 305, and the tracing wires 302 and 303, or both. When more than one tracing wire is attached to a duct body, the width of the attachment base can vary to accommodate different sized insulating jackets and tracing wires and the attachment bases can be the same or different from each other. While FIG. 3 depicts two tracing wires coupled to the duct body, three or four or more tracing wires may be coupled to the duct body using an insulating jacket and attachment base.

Figure 4:
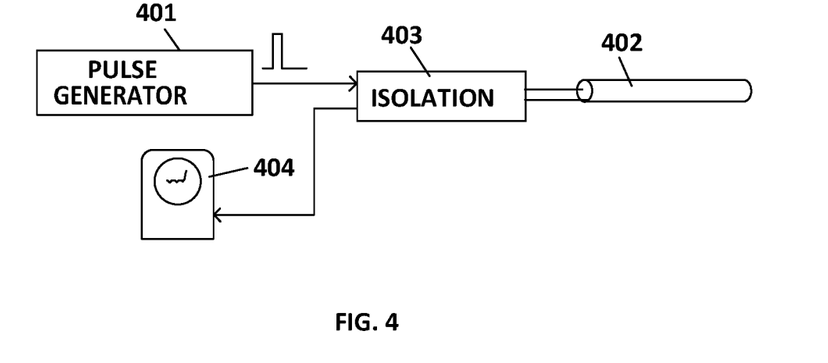
FIG. 4 depicts a system to determine leakage in a duct body, according to an exemplary embodiment.

FIG. 4 depicts a pulse generator 401 or any other known signal generator coupled to a tracer wire 402 by means of a suitable isolation circuit 403. The isolation circuit may be a passive circuit or may be an active switching circuit that directs the pulse from the pulse generator to the cable when the pulse is present and directs any reflected wave from the cable to an analyzing device such as, for example, an oscilloscope 404. As the pulse propagates down the line, the voltage across the cable will be proportional to the characteristic impedance of the cable. After the pulse has been applied to the cable, there will be a signal present at the input of the cable until a reflected waveform is received. If the characteristic impedance of the cable is uniform and is matched to the pulse of the generator there will be no reflected wave received until the pulse propagates along the entire length of the cable and is reflected by the end of the cable that is normally open circuited. However, because the cables generally do not have characteristic impedance that is perfectly matched to the impedance of the pulse generator, reflections will occur when the pulse encounters such irregularities in impedance. The reflected waveform across the input to the cable would be similar to the waveform illustrated in FIG. 5, which is illustrative of the type of waveform that would be displayed on the oscilloscope 404. The reflected waveforms may be stored in a memory storage device.

Figure 5:
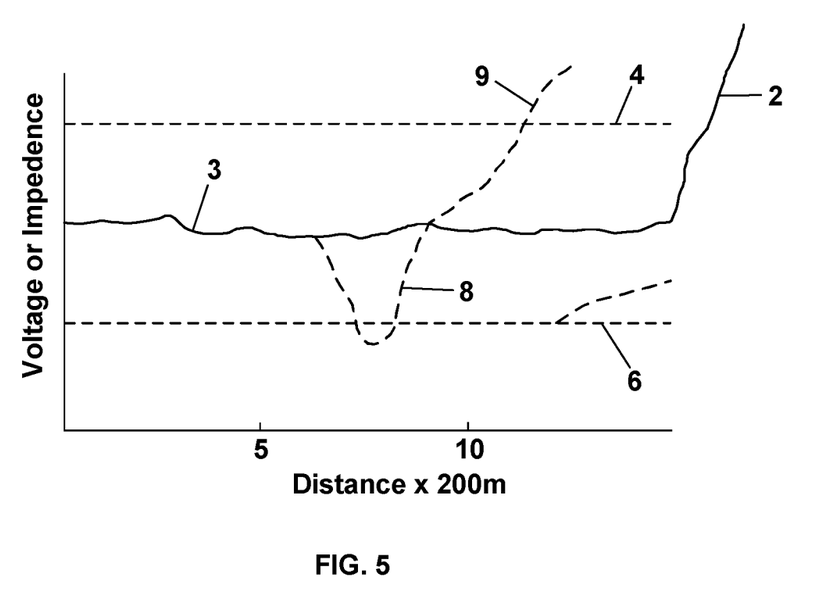
FIG. 5 depicts a waveform, according to an exemplary embodiment.

Referring now to FIG. 5, the waveform has an essentially horizontal section 3 and an upwardly (or downwardly) extending section 2. The essentially horizontal section 3 is the result of reflection within the cable and is a function of the characteristic impedance along the length of the cable. Thus the amplitude of the reflected waveform will vary as the characteristic impedance of the cable varies. The upwardly extended portion of the waveform 2 is the result of the pulse being reflected from the open circuited end of the cable. If desired, the far end of the cable could be short-circuited thus resulting in a downwardly extending end reflection, or otherwise terminated. A pair of thresholds 4 and 6 frames the horizontal section 3 of the waveform. The thresholds 4 and 6 are separated from the horizontal section of the waveform by an amount sufficient to accommodate variations in the amplitude of the horizontal section 3 of the waveform caused by variations in the characteristic impedance of the cable. Thus, under normal circumstances, in the absence of any breaks or leaks the thresholds 4 and 6 would define the upper and lower changes in magnitude of the horizontal section of the waveform.

In the event of a leak, the characteristic impedance of the transmission line will change. In most cases, this change is a decrease in characteristic impedance that occurs in the proximity of the leak or break, resulting in a dip 8 in the waveform. If the dip 8 is of sufficient magnitude to cross the threshold value, an alarm indicating a leak is sounded and the approximate position of the leak is determined from the position of the dip 8 in the waveform. Similarly, in the event of a break in the cable, a new end echo 9 resulting from the reflection at the break in the cable occurs. If this end echo 9 is of sufficient magnitude to cross the threshold, such as the upper threshold 4, an alarm is also sounded. Various other known leak detection means may also be used. As the tracer wire 202 is coupled to the duct body via the attachment base 206, it is less likely that an irregularity in the impedance is caused by damage to the tracing wire. The tracing wire is coupled more securely to the duct body, thus reducing the likelihood that the tracing wire is dislodged or damaged.

In another embodiment, a co-axial cable may be used as the tracer wire. The co-axial is co-extruded along the entire length of the non-metallic pipe using an insulating jacket and attachment base as described in the above embodiments.

Certain embodiments include a method of detecting a leak in a concealed pipe. The method includes the steps of providing a pipe assembly containing a pipe, an insulating jacket coupled to the pipe via an attachment base, and a tracer wire within the insulating jacket; connecting the tracer wire on the pipe to a pulse generator; passing pulses through the tracer wire by the pulse generator; receiving reflections of the pulses from the cable; and analyzing the reflections to determine presence of leak and its position. The pipe assembly further includes the attachment base with a width greater than a width of the insulating jacket.

Certain embodiments include a method of joining two non-metallic pipes with co-extruded tracer cables. The method includes the steps of peeling a tracer cable from the insulation jacket from pipes to be joined together; inserting the peeled off tracer cable into a heat shrinkage sleeve; joining the two ends of peeled off tracer cable to the lugs of a multistrand insulated wire; and heating the heat shrinkage sleeve to seal the joint. The tracer cables are attached to the pipes via attachment bases, having a width greater than the width of the insulating jacket.

Figure 6A:
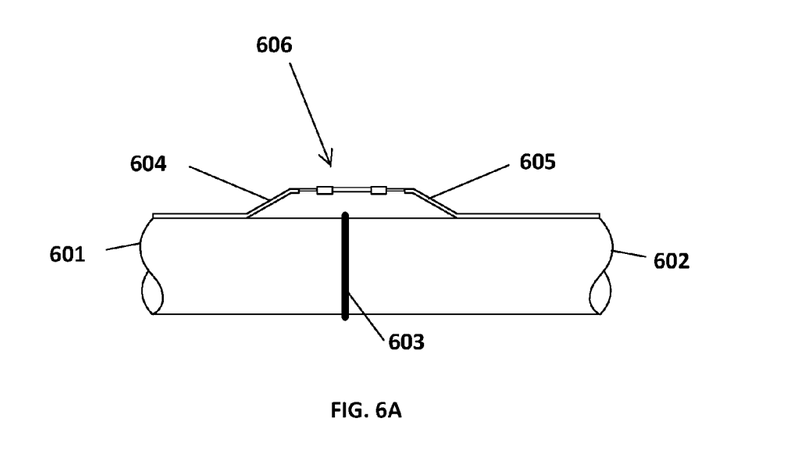
FIGS. 6A and 6B depict the joining of tracer wires when connecting pipes, according to an exemplary embodiment.
Figure 6B:
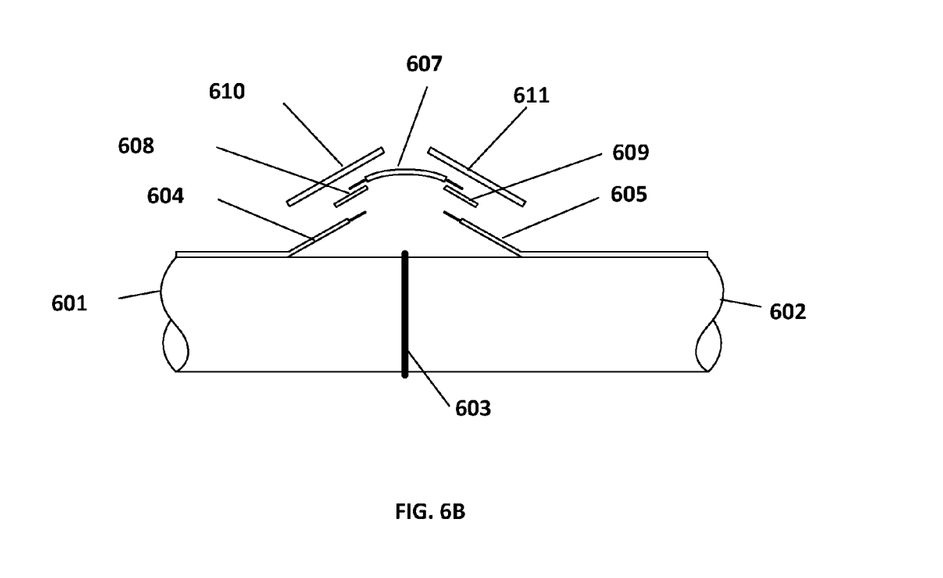

When a plurality of pipe assemblies are joined, one or more means of welding them can be utilized, for example butt welding or fillet welding. FIG. 6A and FIG. 6B show a method of joining two tracer wires on adjacent pipes. As shown in FIG. 6A, the pipes 601 and 602 are laid end-to-end and welded to form a leak proof joint 603, such as by butt welding. Tracer wires 604 and 605 are peeled off from ends of both the pipes and passed through a heat shrinkage sleeve 606. FIG. 6B shows the method in greater detail. Tracer wires 604 and 605 are connected to multistrand flexible cable 607 through tubular metal lugs 608 and 609 for crimping that cover the joints of the tracer wires 604 and 605 and the multistrand flexible cable 607. Heat is then applied to the components 610 and 611 of the heat shrinkage sleeve and the whole joining assembly is sealed.

The tracer wire is made of an electrically conductive material. Examples of materials for the trace wire include copper, aluminum, tungsten, zinc, nickel, iron, steel, or combinations thereof. In an embodiment, the tracer wire is made of high-grade 99.95% pure copper wire of specified thickness to provide the desired conductivity for carrying the tracer and leak detection signal. In an embodiment, the exact location of the duct body with co-extruded tracer wire is carried out with a multiple frequency locator. This equipment broadly consists of a transmitter and a receiver. The transmitter sends an electrical signal to the tracer wire coupled to the pipe being traced, while the receiver picks up that signal, allowing the trace of the signal's path and follow the pipe under detection. When the tracer wire is energized, a sensing device on the surface coupled to the receiver can pick up the signals and thus, the exact location of the under-ground pipe can be determined.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A method comprising:
   connecting a pulse generator to a pipe assembly comprising a pipe, an insulating jacket coupled to the pipe via an attachment base, and a tracer wire within the insulating jacket, wherein width of the attachment base is greater than width of the insulating jacket, wherein the insulating jacket and the attachment base define a T-shape such that the attachment base is positioned between the tracer wire and the pipe;
   passing pulses through the tracer wire by the pulse generator;
   receiving reflections of the pulses from the tracer wire; and
   analyzing the reflections to determine presence of a leak in the pipe.

2. The method of claim 1, further comprising analyzing the reflections to determine position of the leak.

3. The method of claim 1, wherein the insulating jacket narrows in thickness toward the attachment base.

4. The method of claim 1, wherein the attachment base has a width within a range of about 5 mm to about 8 mm.

5. The method of claim 1, wherein the reflections are received via an oscilloscope.

6. The method of claim 1, wherein the pipe includes a non-metallic material.

7. The method of claim 1, wherein the pipe includes a high-density polyethylene.

8. The method of claim 1, wherein the tracer wire includes an electrically conductive material.

9. The method of claim 1, wherein the pipe includes a plurality of pipes that are butt welded together to form a continuous pipeline.

10. The method of claim 1, wherein the tracer wire is included in a flexible multi strand cable.

11. The method of claim 1, wherein the flexible multi strand cable has an end portion inclusive of a lug.

12. The method of claim 11, wherein the lug is configured for crimping.

13. The method of claim 11, wherein the lug is tubular.

14. The method of claim 11, wherein the lug includes metal.

15. The method of claim 1, wherein the pulse generator is connected to the pipe assembly while the pipe assembly is positioned below a ground surface.

16. The method of claim 1, wherein the pulses are passed through the tracer wire while the pipe assembly is positioned below a ground surface.

17. The method of claim 1, wherein the reflections are received from the tracer wire while the pipe assembly is positioned below a ground surface.

18. The method of claim 1, wherein the reflections are analyzed above a ground surface.

* * * * *